(12) United States Patent  
Piyabongkarn et al.

(10) Patent No.: US 7,873,454 B2
(45) Date of Patent: Jan. 18, 2011

(54) METHOD OF IDENTIFYING PREDICTIVE LATERAL LOAD TRANSFER RATIO FOR VEHICLE ROLLOVER PREVENTION AND WARNING SYSTEMS

(75) Inventors: Damrongrit Piyabongkarn, Medina, MN (US); Qinghui Yuan, Maple Grove, MN (US); Jae Y. Lew, Shorewood, MN (US)

(73) Assignee: Eaton Corporation, Cleveland, OH (US)

( * ) Notice: Subject to any disclaimer, the term of this patent is extended or adjusted under 35 U.S.C. 154(b) by 932 days.

(21) Appl. No.: 11/796,875

(22) Filed: Apr. 30, 2007

(65) Prior Publication Data

US 2007/0260362 A1 Nov. 8, 2007

Related U.S. Application Data

(60) Provisional application No. 60/797,165, filed on May 3, 2006.

(51) Int. Cl.
*G06F 19/00* (2006.01)
(52) U.S. Cl. ..................... 701/45; 303/140
(58) Field of Classification Search ............... 701/45, 701/41, 48, 124; 303/140–148, 166; 180/197, 180/248
See application file for complete search history.

(56) References Cited

U.S. PATENT DOCUMENTS

| 5,825,284 | A | 10/1998 | Dunwoody et al. |
| 7,145,442 | B1 * | 12/2006 | Wai ............................ 340/438 |
| 7,233,236 | B2 * | 6/2007 | Lu et al. ..................... 340/440 |
| 2005/0234623 | A1 | 10/2005 | Theisen |

* cited by examiner

*Primary Examiner*—Dalena Tran
(74) *Attorney, Agent, or Firm*—Dykema Gossett PLLC

(57) ABSTRACT

A method for controlling stability of a vehicle includes the steps of determining a predictive lateral load transfer ratio of the vehicle by evaluating vehicle performance factors over a period of time, and controlling operation of the vehicle based on the predictive lateral load transfer ratio.

7 Claims, 2 Drawing Sheets

METHOD OF IDENTIFYING PREDICTIVE LATERAL LOAD TRANSFER RATIO FOR VEHICLE ROLLOVER PREVENTION AND WARNING SYSTEMS

CROSS-REFERENCE TO RELATED APPLICATIONS

The present application claims priority to U.S. Provisional Patent Application Ser. No. 60/797,165, which was filed on May 3, 2006 and is incorporated herein by reference in its entirety.

BACKGROUND OF THE DISCLOSURE

Vehicle rollover has the highest fatality rate among non-collision vehicle accidents. To prevent vehicle rollover, a rollover index called Lateral Load Transfer Ratio (LTR) has been used to detect vehicle rollover propensity. Typically, LTR is estimated from vehicle information measured at a fixed point in time. In analogy, it is like taking a snap-shot of a dynamic system and using this information (frozen in time) to determine the vehicle rollover threat. If the threshold of the LTR is set to be too low, it will give a warning or prematurely activate the vehicle rollover prevention system during normal driving. If the threshold is set to be too high, it may be too late to prevent the vehicle from rollover. Determining the LTR threshold is difficult due to dynamic changes in vehicle operation or unexpected disturbances, which cannot be captured using only static LTR.

BRIEF SUMMARY OF THE INVENTION

A method for controlling stability of a vehicle is provided that includes the steps of determining a predictive lateral load transfer ratio of the vehicle by evaluating vehicle performance factors over a period of time, and controlling operation of the vehicle based on the predictive lateral load transfer ratio. In an embodiment of the invention, the predictive lateral load transfer ratio may be used to detect the rollover propensity of a vehicle prior to the vehicle operating in a condition that induces vehicle rollover. With this prediction capability, operation of a vehicle rollover warning system may be improved to provide a vehicle operator with advanced warning of an impending rollover. Moreover, a rollover prevention system, including torque-biasing devices such as electronic limited-slip differentials, may be operated to prevent vehicle rollover.

DETAILED DESCRIPTION

Figure 1:
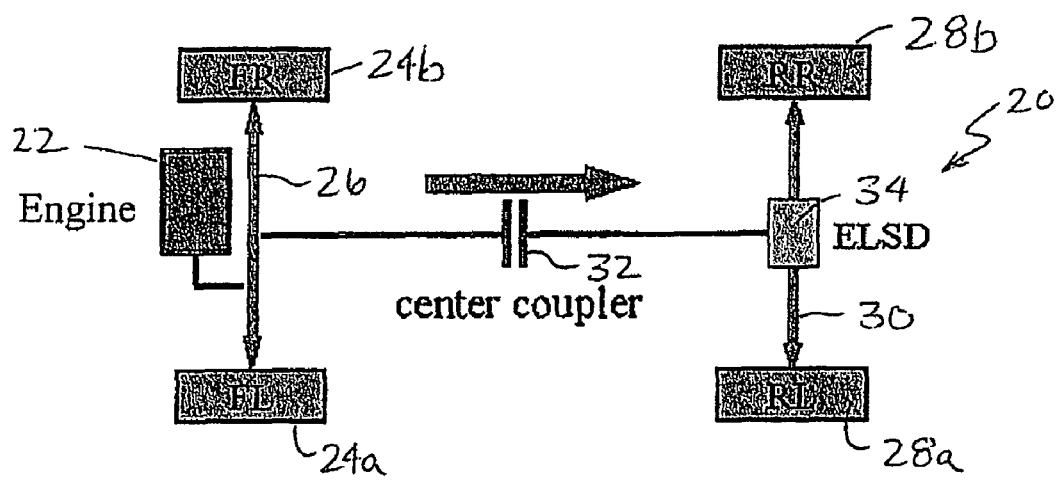
FIG. 1 is a schematic illustration of an exemplary all-wheel-drive vehicle employing a vehicle stability control system according to an embodiment of the present invention.

Referring now to the drawings, which are not intended to limit the invention, FIG. 1 schematically illustrates an exemplary all-wheel-drive vehicle 20 including a laterally-positioned engine 22. The engine 22 is linked to a pair of front wheels 24a, 24b through a front axle or transaxle 26 and to a pair of rear wheels 28a, 28b through a rear axle 30. The front axle 26 is primarily and directly driven by the engine 22. The rear axle 30 is indirectly driven via a power transfer unit (not shown) and a center coupling apparatus or coupler 32. The rear axle 30 is mechanically linked to the front transaxle 26 through one or more drive- or prop-shafts. An optional electronically controlled limited slip differential (ELSD) 34 is used to bias the rear prop-shaft torque to the rear wheels 28a, 28b. Coupler 32 and ELSD 34 may be well known devices in the art, and may be controlled by a vehicle control system 58 (shown in FIG. 2), such as a vehicle electronic control unit (ECU) or other controller. It will be appreciated that vehicle 20 is not limited to the configuration shown in the drawings and may include other configurations, including, without limitation, two-wheel drive configurations.

Figure 2:
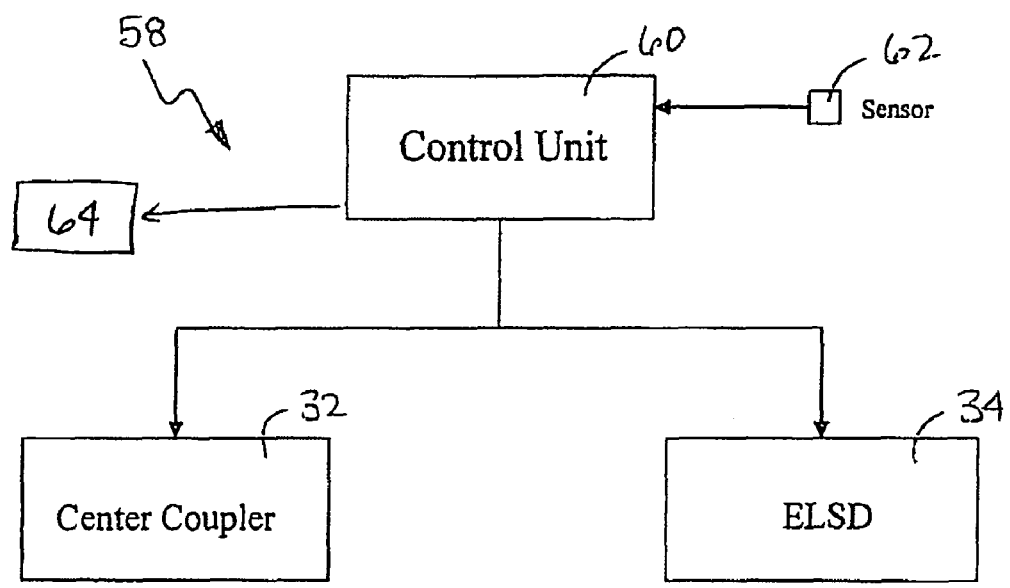
FIG. 2 is a schematic illustration of a vehicle stability control system according to an embodiment of the present invention.

As shown in FIG. 2, the control system 58 may include a control unit 60, such as a microprocessor-based ECU including a memory device having stored therein, for example, one or more maps containing vehicle operating parameter information, and at least one vehicle sensor 62 for measuring a vehicle performance factor(s), such as, without limitation, a yaw rate sensor, wheel speed sensor, lateral acceleration sensor and/or a steering angle sensor. The control unit 60 provides an input signal to the center coupler 32 and/or the ELSD 34 to control engagement and disengagement of the devices to distribute torque between the wheels or axles. The control unit 60 may also control operation of a roll warning device 64, such as, for example, and audible warning device or visual indicator in the vehicle dash, to warn a vehicle operator of an impending vehicle rollover.

Figure 3:
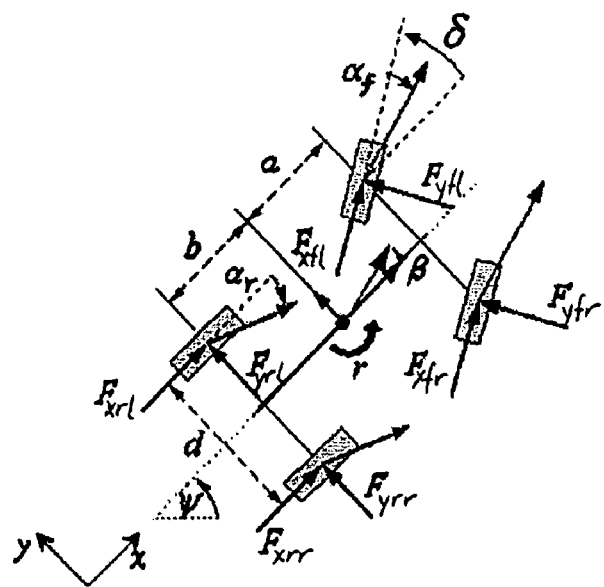
FIG. 3 is a model of vehicle dynamics during lateral operation.
Figure 4:
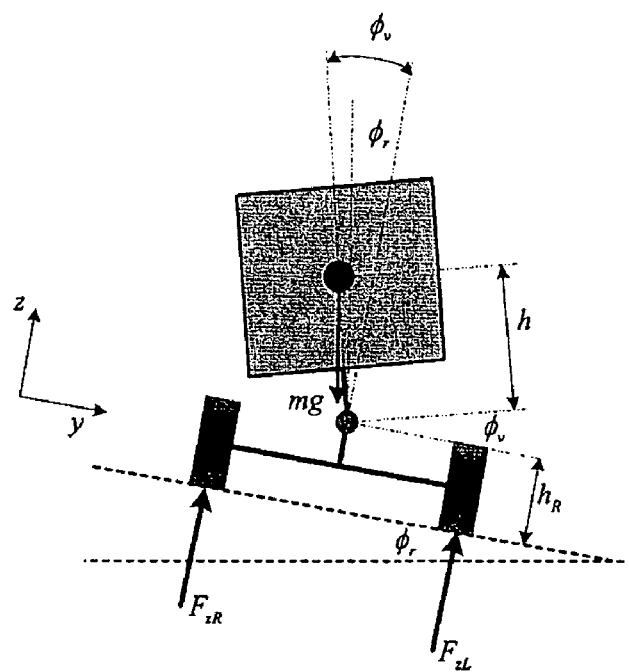
FIG. 4 is a model of vehicle dynamics during vehicle roll.

Referring now to FIGS. 3 and 4, the vehicle LTR may be determined from vehicle nonlinear models as:

$$LTR := \frac{F_{zL} - F_{zR}}{F_{zL} + F_{zR}} \quad (1)$$

Taking into account the lateral dynamics of the vehicle:

$$m\dot{v} = F_{yrl} + F_{yrr} + (F_{xfl} + F_{xfr})\sin\delta + (F_{yfl} + F_{yfr})\cos\delta - \quad (2)$$
$$mru + mg\sin\phi_r - mh\sin\phi_v r^2 - mh\dot{\phi}_v^2\sin\phi_v + mh\cos\phi_v\ddot{\phi}_v$$

or $$m\dot{v} + mru - mg\sin\phi_r + mh\sin\phi_v r^2 + mh\dot{\phi}_v^2\sin\phi_v - mh\cos\phi_v\ddot{\phi}_v =$$

$$mA_y = F_{yrl} + F_{yrr} + (F_{xfl} + F_{xfr})\sin\delta + (F_{yfl} + F_{yfr})\cos\delta = \sum F_y$$

wherein m is the vehicle mass, $\dot{v}$ is the vehicle lateral velocity, r is the vehicle yaw rate, u is the vehicle longitudinal velocity, g is the acceleration of gravity, $A_y$ is the vehicle lateral acceleration, and h is the height of the center of gravity relative to the vehicle rotational point as shown in FIG. 4.

Taking into account the roll dynamics of the vehicle:

$$(I_{xx} + mh^2\sin^2\phi_v)(\ddot{\phi}_v - \ddot{\phi}_r) = (F_{zL} - F_{zR}) \cdot \frac{T}{2} + \quad (3)$$
$$\sum F_y \cdot h_R + (m\dot{v} + mru) \cdot h\cos\phi_v + mg \cdot h\sin\phi_v\cos\phi_r -$$
$$mg \cdot h\cos\phi_v\sin\phi_r + [(I_{yy} - I_{zz}) - mh^2]r^2 \cdot \sin(\phi_v - \phi_r)\cos(\phi_v - \phi_r)$$

Taking into account the vertical dynamics of the vehicle:

$$m\ddot{z} = m(\dot{\phi}_v^2 h \cos\phi_v + \ddot{\phi}_v h \sin\phi_v) = (F_{zL} + F_{zR}) - mg\cos\phi_r \quad (4)$$

wherein $\ddot{z}$ is the vehicle vertical acceleration.

Accordingly, taking into account equations (1)-(4), the LTR may be expressed as follows:

$$LTR = \frac{2}{T} \cdot \frac{\begin{vmatrix} (I_{xx} + mh^2\sin^2\phi_v)(\ddot{\phi}_v - \ddot{\phi}_r) - mA_y \cdot h_R + \\ mA_{y2}h\cos\phi_v - mg\cdot h\sin\phi_v\cos\phi_r + mg \cdot \\ h\cos\phi_v\sin\phi_r - [(I_{yy} - I_{zz}) - mh^2]r^2 \cdot \\ \sin(\dot{\phi}_v - \dot{\phi}_r)\cos(\dot{\phi}_v - \dot{\phi}_r) \end{vmatrix}}{m(\dot{\phi}_v^2 h\cos\phi_v + \ddot{\phi}_v h\sin\phi_v) + mg\cos\phi_r}$$

wherein $I_{xx}$, $I_{yy}$ and $I_{zz}$ are the moments of inertia about x, y and z axis respectively, and wherein $$A_y = \dot{v} + ru - g\sin\phi_r + h\sin\phi_v r^2 + h\dot{\phi}_v^2 \sin\phi_v - h\cos\phi_v \ddot{\phi}_v,$$
$$\text{and } A_{y2} = \dot{v} + ru.$$

For relatively small values of $\phi_v$, $\dot{\phi}_v$, $\ddot{\phi}_v$, $\dot{\phi}_r$, $\ddot{\phi}_r$, the LTR may then be expressed as:

$$LTR = \frac{2}{T} \cdot \frac{-mA_{y2}\cdot(h_R + h) + mg\cdot h_R\sin\phi_r + mg\cdot h\sin\phi_r}{mg} \quad (6)$$

or $$LTR = \frac{2}{T} \cdot \frac{-A_{y2}\cdot(h_R + h)}{g} + \frac{2}{T}\cdot(h_R + h)\sin\phi_r \quad (7)$$

For a small $\phi_r$, the LTR may be further estimated as:

$$LTR = \frac{2}{T} \cdot \frac{-A_{y\_meas}\cdot h_{CG}}{g} \quad (8)$$

wherein, $A_{y\_meas}$ is the lateral acceleration, which may be obtained using an accelerometer, and $h_{CG}$ is the total vehicle center of gravity (CG) height.

In accordance with an embodiment of the present invention, a method for determining LTR of a vehicle is provided that includes a predictive LTR (PLTR), which evaluates vehicle performance factors over a period of time, rather than a fixed point in time. The method is designed to accurately "count-down" toward rollover or evaluate vehicle performance prior to rollover under a wide range of vehicle operating conditions. Derivation of PLTR is shown as follows:

$$PLTR_{t_0}(\Delta t) = LTR(t_0) + L\dot{T}R(t_0)\cdot\Delta t \quad (9)$$

$$PLTR_{t_0}(\Delta t) = \frac{2}{T}\cdot\frac{A_{y\_meas}(t_0)\cdot h_{CG}}{g} + \frac{2}{T}\cdot\frac{h_{CG}}{g}\frac{d}{dt}(A_{y\_meas})\cdot\Delta t \quad (10)$$

wherein $A_{y\_meas}$ is the measured vehicle lateral acceleration.

Equation (10) expresses PLTR at time $t_0$ predicted for a future time horizon $\Delta t$. The effect of the sign of the measured lateral acceleration may be neglected in this derivation for proof-of-concept purposes. The measured lateral acceleration $A_{y\_meas}$ in equation (10) is typically noisy and, therefore, it is difficult to obtain a smooth value after a derivation. The following filtering technique is used to reduce noise:

$$PLTR_{t_0}(\Delta t) = \frac{2}{T}\cdot\frac{A_{y\_meas}(t_0)\cdot h_{CG}}{g} + \frac{2}{T}\cdot\frac{h_{CG}}{g}\left(\frac{1}{\tau s + 1}\dot{A}_{y\_meas} + \frac{\tau s}{\tau s + 1}\dot{A}_{y\_meas}\right)\cdot\Delta t \quad (11)$$

wherein $\tau$ is a time constant.

The measured lateral acceleration can be further estimated from a relationship with the steering angle using a linear model, $$\frac{\dot{A}_y}{\delta_w} = TF_{Model}(s) \quad (12)$$

wherein $TF_{Model}(s)$ is a linear transfer function of the steering angle and the lateral acceleration based on the linear model, and $\delta_w$ is an actual average steered wheel angle. By using this model-based filter, the noise from the derivation of the lateral acceleration can be filtered out using a low-pass filter. Moreover, driver's steering input information plays an important role in predicting the rollover index due to the delay of the steering system.

Accordingly, the PLTR is provided as follows:

$$PLTR_{t_0}(\Delta t) = \frac{2}{T}\cdot\frac{A_{y\_meas}(t_0)\cdot h_{CG}}{g} + \frac{2}{T}\cdot\frac{h_{CG}}{g} \left(\frac{s}{\tau s + 1}A_{y\_meas}(t_0) + \frac{\tau s}{\tau s + 1}TF_{model}(s)\cdot s\frac{1}{\tau_{sw}s + 1}\cdot\frac{1}{SR}\delta_d(t_0)\right)\cdot\Delta t \quad (13)$$

wherein $$\frac{\delta_w}{\delta_d} = \frac{1}{SR}\cdot\frac{1}{\tau_{sw}s + 1}, \delta_d$$

is the driver's steering wheel angle, $\tau_{sw}$ is the steering first-order time constant and SR is the steering ratio.

A filter, $$\frac{s}{\tau s + 1},$$

may be used on the measured lateral acceleration and a filter, $$\frac{\tau s^2}{(\tau s + 1)(\tau_{sw}s + 1)}\cdot TF_{model}(s),$$

may be used on the driver's steering wheel angle. The selected $\Delta t$ needs to be long enough to cover the rollover prevention system response time.

Unlike more conventional methods of determining LTR, the new method of determining PLTR may be used by control system 58 to control a vehicle torque biasing device (e.g., center coupling 32 and ELSD 34) to improve vehicle stability and inhibit vehicle rollover. In the embodiment shown in FIGS. 1 and 2 for example, the PLTR may be used by controller 60 to determine when and to what extent to engage the torque biasing devices to increase yaw damping of the vehicle and prevent vehicle rollover. For example, and without limitation, control unit 60 may be configured such that center coupler 32 and/or ELSD 34 are operated once the PLTR exceeds a threshold value(s) or the rate of change of PLTR exceeds a predetermined threshold rate. The PLTR may also be used to control operation of roll warning device 64 to warn a vehicle operator of an impending vehicle rollover. It will also be appreciated that use of the PLTR to control operation of a vehicle torque biasing device or roll warning device is not limited thereto, and that the PLTR may be used to control other vehicle systems, such as the vehicle brake system or power steering system, to inhibit vehicle rollover.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A method for controlling stability of a vehicle comprising the steps of:

determining a predictive lateral load transfer ratio (PLTR) of the vehicle by evaluating vehicle performance factors over a period of time, wherein the PLTR reflects the PLTR calculated at a selected point in time $t_0$ for a future time horizon $\Delta t$; and controlling operation of the vehicle based on the PLTR.

2. The method of claim 1, wherein the vehicle includes a torque biasing device for controlling the distribution of torque between a pair of vehicle wheels or between a pair of vehicle axles, and the step of controlling operation of the vehicle includes engaging the torque biasing device to control torque distribution between the pair of vehicle wheels or the pair of vehicle axles.

3. The method of claim 1, wherein vehicle includes a roll warning device, and the step of controlling operation of the vehicle includes operating the roll warning device to warn a vehicle operator of an impending vehicle rollover.

4. The method of claim 1, wherein the step of determining the PLTR includes estimating vehicle lateral acceleration from a relationship with a vehicle steering angle using a linear model:

$$\frac{A_y}{\delta_s} = TF_{Model}(s),$$

wherein $TF_{Model}(s)$ is a linear transfer function of the steering angle and the lateral acceleration based on the linear model, and $\delta_w$ is an actual, average steered wheel angle.

5. The method of claim 1, wherein the determining step includes determining the predictive lateral load transfer ratio as follows:

$$PLTR_{t_0}(\Delta t) = \frac{2}{T} \cdot \frac{A_{y\_meas}(t_0) \cdot h_{CG}}{g} + \frac{2}{T} \cdot \frac{h_{CG}}{g} \left( \frac{s}{\tau s + 1} A_{y\_meas}(t_0) + \frac{\tau s}{\tau s + 1} TF_{model}(s) \cdot s \frac{1}{\tau_{sw}s + 1} \cdot \frac{1}{SR} \delta_d(t_0) \right) \cdot \Delta t$$

wherein $\Delta t$ is the future time horizon, $$\frac{\delta_w}{\delta_d} = \frac{1}{SR} \cdot \frac{1}{\tau_{sw}s + 1}, \delta_d$$

is a vehicle steering wheel angle, $\tau_{sw}$ is a steering first-order time constant, and SR is the steering ratio.

6. The method of claim 5, further including the step of using a filter, $$\frac{s}{\tau s + 1},$$

on the measured lateral acceleration and using a filter, $$\frac{\tau s^2}{(\tau s + 1)(\tau_{sw}s + 1)} \cdot TF_{model}(s),$$

on the driver's steering wheel angle.

7. The method of claim 5, wherein the vehicle includes a control system and the determining step includes selecting the future time horizon $\Delta t$ to be at least as long as the vehicle rollover prevention system response time.

* * * * *

UNITED STATES PATENT AND TRADEMARK OFFICE
CERTIFICATE OF CORRECTION

PATENT NO. : 7,873,454 B2  Page 1 of 1
APPLICATION NO. : 11/796875
DATED : January 18, 2011
INVENTOR(S) : Piyabongkarn et al.

It is certified that error appears in the above-identified patent and that said Letters Patent is hereby corrected as shown below:

Claim 5, column 6, line 26, delete " $\frac{\delta_w}{\delta_d} = \frac{1}{SR} \cdot \frac{1}{\tau_{sw}s+1}$ , $\delta_d$ ,, Claim 5, column 6, line 26, insert -- $\frac{\delta_w}{\delta_d} = \frac{1}{SR} \cdot \frac{1}{\tau_{sw}s+1}$ , --.

Claim 5, column 6, line 29, before "is a vehicle steering wheel angle" insert -- $\delta_d$ --.

Signed and Sealed this
Twenty-second Day of March, 2011

David J. Kappos
*Director of the United States Patent and Trademark Office*